United States Patent [19]

Bennett et al.

[11] Patent Number: 4,508,556
[45] Date of Patent: Apr. 2, 1985

[54] METHOD AND APPARATUS FOR BENDING GLASS SHEETS TO COMPLICATED SHAPES INCLUDING AN S-SHAPED TRANSVERSE BEND

[75] Inventors: Terry A. Bennett, Verona; George R. Claassen, New Kensington; William B. Zimmerman, Pittsburgh, all of Pa.

[73] Assignee: PPG Industries, Inc., Pittsburgh, Pa.

[21] Appl. No.: 616,764

[22] Filed: Jun. 4, 1984

[51] Int. Cl.³ .......................................... C03B 23/035
[52] U.S. Cl. ...................................... 65/25.4; 65/106; 65/107; 65/273; 65/289
[58] Field of Search ................ 65/25.4, 106, 107, 273, 65/287, 289

[56] References Cited

U.S. PATENT DOCUMENTS

| | | | |
|---|---|---|---|
| 3,223,501 | 12/1965 | Fredley et al. | 65/25.4 |
| 3,291,590 | 12/1966 | McMaster | 65/25.4 |
| 3,332,762 | 7/1967 | McMaster et al. | 65/25.4 |
| 3,399,042 | 8/1968 | McMaster et al. | 65/25.4 |
| 3,497,340 | 2/1970 | Dennison et al. | 65/25.4 |
| 3,526,489 | 9/1970 | McPhail | 65/25.4 |
| 3,846,104 | 11/1974 | Seymour | 65/104 |
| 4,204,853 | 5/1980 | Seymour | 65/106 |
| 4,217,126 | 8/1980 | Hagedorn et al. | 65/106 |
| 4,265,650 | 5/1981 | Reese et al. | 65/287 X |
| 4,272,275 | 6/1981 | Reese | 65/273 |
| 4,432,782 | 2/1984 | Seymour | 65/25.4 X |

Primary Examiner—Arthur Kellogg
Attorney, Agent, or Firm—Andrew C. Siminerio; Edward I. Mates

[57] ABSTRACT

The invention involves a method and apparatus for bending glass sheets to an S-shaped transverse bend with a longitudinal bend. The heat softened glass sheets are serially conveyed onto a gas hearth bed having a downwardly curved end portion at the downstream end thereof such that the glass sheet curves into conformation with the gas hearth, then by means of a curved outline mold lifting the glass sheet vertically into conformation with an overlying vacuum mold, holding the shaped sheet into contact with the vacuum mold by vacuum while lowering the outline mold, then moving a shuttle ring beneath the glass sheet, discontinuing the vacuum such that the glass sheet is deposited onto the shuttle ring and then moving the shuttle ring and glass sheet laterally for further processing.

15 Claims, 7 Drawing Figures

METHOD AND APPARATUS FOR BENDING GLASS SHEETS TO COMPLICATED SHAPES INCLUDING AN S-SHAPED TRANSVERSE BEND

BACKGROUND OF THE INVENTION

The present invention relates generally to the production of bent glass sheets, and, more particularly, to an improved method and apparatus for bending glass sheets to special configurations that incorporates an S-shaped transverse bend as well as a longitudinal bend.

Bent glass sheets are commonly used as glazing closures in vehicles such as automobiles and the like. For such applications, the glass sheets must be bent to precisely defined curvatures dictated by the configuration and outline of the vehicle openings in which the sheets are to be installed as well as the overall styling of the vehicle. At the same time, it is important that the bent sheets meet very stringent optical requirements so that the viewing area of the resulting shaped window is free of optical defects that would interfere with good vision through the window. For certain windows used as glazing closures, the bent glass sheets are tempered to strengthen them and increase their resistance to damage resulting from impact. Furthermore, in the less frequent breakage of tempered glass, the resulting particles are relatively small and smoothly surfaced and thus are less likely to cause damage to an occupant of a vehicle than untempered glass, which fractures under less severe loads and causes particles having jagged edges of a larger size that are more likely to injure vehicle occupants.

In recent years, the glass sheets have been press bent into complicated shapes while suspended from tongs. However, tongs tend to penetrate into the major surfaces of the glass and provide localized portions that have poor optical properties as well as providing mechanical weakness for the glass in the vicinity of the points gripped by the tongs.

It has also been customary in the glass sheet bending art to press bend the glass sheets supported in a horizontal position, either on a series of conveyor rolls, or by a gaseous hearth bed which supports the glass in close relation thereover by hot gas, lifting the glass from proximity to the support plane provided either by conveyor rolls or the gaseous support bed into engagement with a vacuum holder and then depositing the glass onto a ring-like member which is interposed between the plane of support and the bottom surface of the vacuum holder. Prior to the present invention, most of the shapes produced by such apparatus were either simple bends or compound bends comprising fairly simple curvatures in both mutually perpendicular directions. The complicated nature of the heating operation to prepare the glass to be soft enought to be shaped by press bending caused the leading edge of the glass to develop a higher temperature than the trailing edge of the glass. This further complicated the shaping of the glass to various complex shapes.

The reason for this complication was that the leading edge of the glass which developed a higher temperature during conveyance through the furnace was more likely to sag than the trailing edge of the glass which developed a lower elevated temperature as a result of conveyance through the furnace. Consequently, attempts to develop a reverse curvature transverse to the general longitudinal curvature to the sheets in a portion of the sheet near a furnace exit was not accomplished in the most efficient manner available.

Glass sheets have been bent to compound curvatures involving bends about mutually perpendicular axes by floating the glass sheets over gaseous support beds that change shape from a flat to a curved configuration transverse to the path of movement and also develop a downwardly convex shape in the direction of movement to impart a relatively simple shape to the glass. However, to the best of our knowledge, gas support beds of this type have not been used in combination with press bending molds comprising upper and lower molds of complementary shape that further shaped the glass sheets to the complicated shapes desired as will be brought out in a discussion of various patents that follows.

The shaping of glass sheets transversely of their path of movement while conveyed along a gaseous support bed that has a flat upstream portion that changes gradually to a desired transversely curved shape is shown in U.S. Pat. Nos. 3,223,501 to Fredley et al.; 3,291,590 to McMaster; 3,332,762 to McMaster et al.; 3,399,042 to McMaster et al; 3,409,422 to Gulotta; 3,497,340 to Dennison et al. and 3,526,489 to McPhail, for example. For example, McMaster et al. 3,399,042 skews the glass sheets conveyed over a gaseous support bed to shape the glass sheets about an axis extending obliquely of a straight side edge and Gulotta 3,409,422 develops a compound curve in glass sheets conveyed along a path over a gaseous hearth bed having a flat upper surface in its upstream zone, a final zone of compound curvature having convexly elevated curvatures extending both transversely and longitudinally of said path and an intermediate zone of a configuration changing progressively from a flat configuration to a configuration curved convexly transversely of said path. None of these patents shows a gas hearth bed that progressively changes from a flat configuration to a configuration curved convexly in elevation in the longitudinal direction and curved concavely in elevation in a direction transversely of a path taken by glass sheets over a gaseous hearth bed.

U.S. Pat. No. 3,846,104 to Seymour illustrates a number of patents that shape glass sheets to a non-uniform shape by delivering one or more heat-softened glass sheets at a time into a position at a shaping station over a gaseous hearth bed having an upwardly facing surface beneath an upper vacuum mold. A lower outline pressing mold of complementary shape is located in vertical alignment below the upper vacuum mold and moves between a retracted position below the upper surface of the bed and an upper position near the upper vacuum mold. The lower outline pressing mold rises to engage the glass sheet(s) against the upper vacuum mold to cause the heat-softened glass sheet to develop a shape conforming to that of the vacuum mold. Suction applied to the upper vacuum mold holds the shaped glass sheet against its lower shaping surface while the lower outline pressing mold restracts to enable a ring-like member having an outline shaping surface that conforms to the supported portion of the glass sheet adjacent its perimeter to shuttle into position below the vacuum mold. The vacuum on the vacuum mold is ended and the shaped glass sheet falls onto the ring-like member which supports the shaped glass sheet adjacent its perimeter for transfer to a cooling station where the glass is cooled sufficiently rapidly to develop a desired degree of temper. To the best of our knowledge, no apparatus of this type has been developed to shape glass sheets to a compound bend comprising a transverse bend component of S-shaped configuration and a longitudinal bend component of concave elevation.

U.S. Pat. No. 4,217,126 to Hagedorn et al. discloses press bending apparatus for bending glass sheets to compound curvatures including a reversely curved portion that is bent in a directin opposite the direction at which a glass sheet sags. The apparatus of this patent comprises a tunnel heating furnace, a shaping station having an upper shaping mold, a discontinuous ring-like lower shaping mold having a downwardly curved transversely extending shaping rail adjacent the furnace, shaping pads within the outline of the ring-like lower shaping mold and a series of spaced, special conveyor rolls that support a heat-softened glass sheet for movement into the shaping station where the lower shaping mold and shaping pads lift the glass sheet into engagement with the upper shaping mold and then retract to enable to special conveyor rolls to convey the bent glass to a cooling station. The lack of a continuous edge support for the shaped glass results in edge wrinkles. Also, the location of the downwardly curved transversely extending shaping rail adjacent the furnace complicates the shaping operation because this patent tries to impart a transverse bend to the trailing end portion of a glass sheet and the temperature gradient established along the glass sheet length comprises a more readily shapable hotter leading end portion and a less hot trailing end portion that is less likely to sag than the hotter leading end portion. Furthermore, since this patent redeposits the bent glass on spaced conveyor rolls before the bent glass is sufficiently cool to retain a permanent shape, the lack of a peripheral support during conveyance of the bent glass to the cooling station results in loss of control of glass sheet shape, particularly its reversely curved trailing end portion.

U.S. Pat. No. 4,265,650 to Reese et al. discloses apparatus for press bending glass sheets that are sag bent to an outline shape of an outline mold and are conveyed into a compound bending station having upper and lower press bending molds of complicated shape including a transverse bend of S-shaped configuration. There, the lower press bending mold lifts the preliminarily bent glass sheet into engagement with the upper press bending mold to develop a compound glass sheet shape. The lower press bending mold lowers to redeposit the compound bent glass onto the outline mold. The latter conveys the compound bent glass through an annealing lehr. This patent requires the glass to be overbent to shapes such that the subsequent sag during annealing compensates for the excess bending to develop the desired final shape. Also, a small margin of the glass remains outside the supporting area provided by the lower press bending mold. Accordingly, special hardware must be provided to force the unsupported glass edge against the press bending mold and avoid edge droop or edge wrinkles.

It would be beneficial for the glass sheet shaping art to develop a method and apparatus for bending glass sheets to a compound bend including a transverse bend component of S-shaped configuration and a longitudinal bend component that takes advantage of the temperature gradient established when the sheets move through a furnace en route to a shaping station and that maintains the complicated shape of the sheets throughout their entire marginal portion during their conveyance from a shaping station to a cooling station so that the compound bent glass sheets are free of edge droop or edge wrinkles and have major surfaces with acceptable optical properties.

BRIEF DESCRIPTION OF THE PRESENT INVENTION

The present invention involves shaping a glass sheet to a complicated shape comprising a longitudinal component of bend containing a concave element in elevation about a transverse axis of bending combined with a transverse bend including a component of bend of generally S-shaped configuration about a longitudinal axis of bending containing both convex and concave elements of bending to one side of the longitudinal center line of the glass sheets and includes shaping a sheet by sagging its leading edge portion downwardly and then sandwiching the sheet between an upper vacuum shaping mold and a lower shaping mold having complementary shaping surfaces conforming to the shape desired for a heat-softened glass sheet, which shape includes a longitudinal bend of concave elevation and a transverse bend including an S-shaped portion which was initially sagged downwardly.

The shaping station for performing this shaping method comprises a gaseous hearth bed having an upper surface shaped with a downwardly curved downstream end portion below an upper vacuum shaping mold for supporting an arriving glass sheet thereover and means to provide motion in an essentially vertical direction to a lower shaping mold between a retracted position below the upper surface of the gaseous hearth bed and a glass sheet engaging position above the upper surface. The apparatus also comprises a ring-like member movable in an essentially horizontal direction to shuttle between a position downstream of the shaping station and an upstream position between the upper vacuum mold and the upper surface of the gaseous hearth bed when the lower mold is in its retracted position.

Conveyor means are also provided for conveying the glass sheet into the shaping station along a path from a tunnel-like heating furnace. The conveyor means transports a glass sheet into the shaping station when the lower outline mold is retracted and the ring-like member is located downstream of the shaping station.

The apparatus that accomplishes the complicated shape includes an upper vacuum mold having a downwardly facing surface of generally concave elevational curvature transverse to the path of glass movement and a reversely curved end portion of S-shape in the downstream direction of the path of movement of glass sheets into the shaping station, and an upper surface for the gaseous hearth bed in the shaping station having an essentially flat upstream portion merging gradually into a downwardly curved end portion that is curved both transversely and longitudinally in the downstream direction of the path to enable the leading edge of the glass sheet to flow downwardly both longitudinally and transversely as it passes over the downstream end portion of the gaseous hearth bed.

In a preferred embodiment of the present invention, the lower shaping mold has an outline configuration comprising a first longitudinal rail portion extending transversely of the path immediately upstream of the gaseous hearth bed, a pair of transverse rail portions flanking the opposite sides of the gaseous hearth bed and extending longitudinally of said path, and a second longitudinal rail portion of S-shaped transverse configuration extending transversely of the path and located immediately downstream of the gaseous hearth bed.

According to the present invention, the second longitudinal rail portion of the lower shaping mold of outline configuration has an S-shaped transverse configuration conforming to the shape desired for the portion of the glass sheet downstream so that when the lower shaping mold is lifted to sandwich the glass sheet between itself and the upper vacuum mold, the sandwiching force between the upper vacuum mold and the lower outline mold shapes the heat-softened glass sheet downstream portion to an S-shaped configuration along the path while the glass sheet is also shaped to a concave elevational shape about an axis extending longitudinally of the path. The downwardly curved end portion of the gaseous hearth bed has a shape that blends into that of the second longitudinal rail portion when the latter is aligned vertically with the downwardly curved end portion of the gaseous hearth bed.

In a method for performing the present invention using the apparatus of the present invention, care is taken to orient the glass sheet properly so that when the glass sheet is loaded at the upstream end of a tunnel-like furnace which heats the glass sheet in a manner such as to cause its leading edge to develop a slightly higher temperature than its trailing edge, and the entire glass sheet to reach a deformation temperature of the glass, so that the portion to be bent to the S-shaped configuration is the downstream portion of the glass. The rate of glass sheet movement through a tunnel-type furnace is such that the leading edge of the glass develops a slightly higher temperature than the traling edge. Hence, the more complicated shape is more readily applied to the hotter leading edge portion of the glass sheet because the viscosity of glass decreases with increasing temperature. Furthermore, since the leading edge of the glass sheet is at a higher temperature than the trailing edge, when the glass sheet moves over the downwardly curved, downstream end portion of the gaseous hearth bed, the glass sheet flows vertically in conformance with the changing shape of the gaseous hearth bed at the shaping station. Thus, the glass sheet begins to sag toward the downwardly curved downstream portion of the gas hearth bed before its leading end is lifted on the second longitudinal shaping rail of transverse configuration including an S-shaped configuration while the lower shaping mold lifts the glass sheet. Had the glass sheet been oriented in the opposite direction, it would be difficult to maintain the leading edge relatively flat and to impart the transverse bend to the trailing edge of the glass sheet.

Apparatus conforming to a preferred embodiment of the present invention includes a ring-like member of outline configuration mounted for shuttle movement along a path intermediate the upper vacuum mold and the gaseous hearth bed between an upstream position between the gaseous hearth bed and the upper vacuum mold and a downstream position located in a cooling station between upper and lower nozzles through which cold tempering medium is applied to apply a chilling effect that imparts a desired degree of temper in the hot shaped glass sheet immediately after shaping. Means is provided to cycle the movements of the molds, the glass sheet and the ring-like member to provide clearance when needed.

In a specific embodiment of apparatus, the outline mold is connected to a rigid reinforcing frame and adjustment means interconnect the reinforcing frame to longitudinally spaced portions of a first longitudinal rail portion and a pair of transverse rail portions to adjust the shape along the length of the first longitudinal rail portion and the transverse rail portions. In addition, at least two spaced auxiliary reinforcing beams form part of the rigid reinforcing frame and interconnect opposite sides of the rigid reinforcing frame along lines located below the second longitudinal rail portion. Adjustment means interconnects the auxiliary reinforcement beams to longitudinally spaced portions of the second longitudinal rail portion, along rows spaced transversely from one another along the length of the second longitudinal rail portion. These adjustment means enable the adjustment of the shape of the second longitudinal rail portion both longitudinally and transversely thereof so as to adjust the desired S-bend configuration in the transverse direction of the length of the second shaping rail portion in blending relation to the downwardly curved end portion of the gaseous hearth bed.

Elongated slots are provided in the second longitudinal rail portion to receive stop members which are spring loaded and extend upward from a cylindrical housing supported by the rigid reinforcing frame. The spring loaded stops retract when the lower mold is lifted into engagement against the upper vacuum mold. The stops are adjustably positioned in locations that the leading edge of the glass sheet reaches when the glass sheet arrives at a proper position within the shaping station. The details of the spring loaded stop members form part of an invention described and claimed in a copending U.S. patent application Ser. No. 616,622, filed on the same date as this application, of Terry A. Bennett, William B. Zimmerman and Barry L. Shadle for SPRING LOADED STOP MEMBER FOR GLASS SHEET BENDING MOLDS.

The benefits of the present invention will be understood more clearly in the light of a description of a preferred embodiment that follows.

BRIEF DESCRIPTION OF THE DRAWINGS

In the drawings that form part of a description of preferred embodiment of the present invention.

DESCRIPTION OF PREFERRED EMBODIMENT

Figure 1:
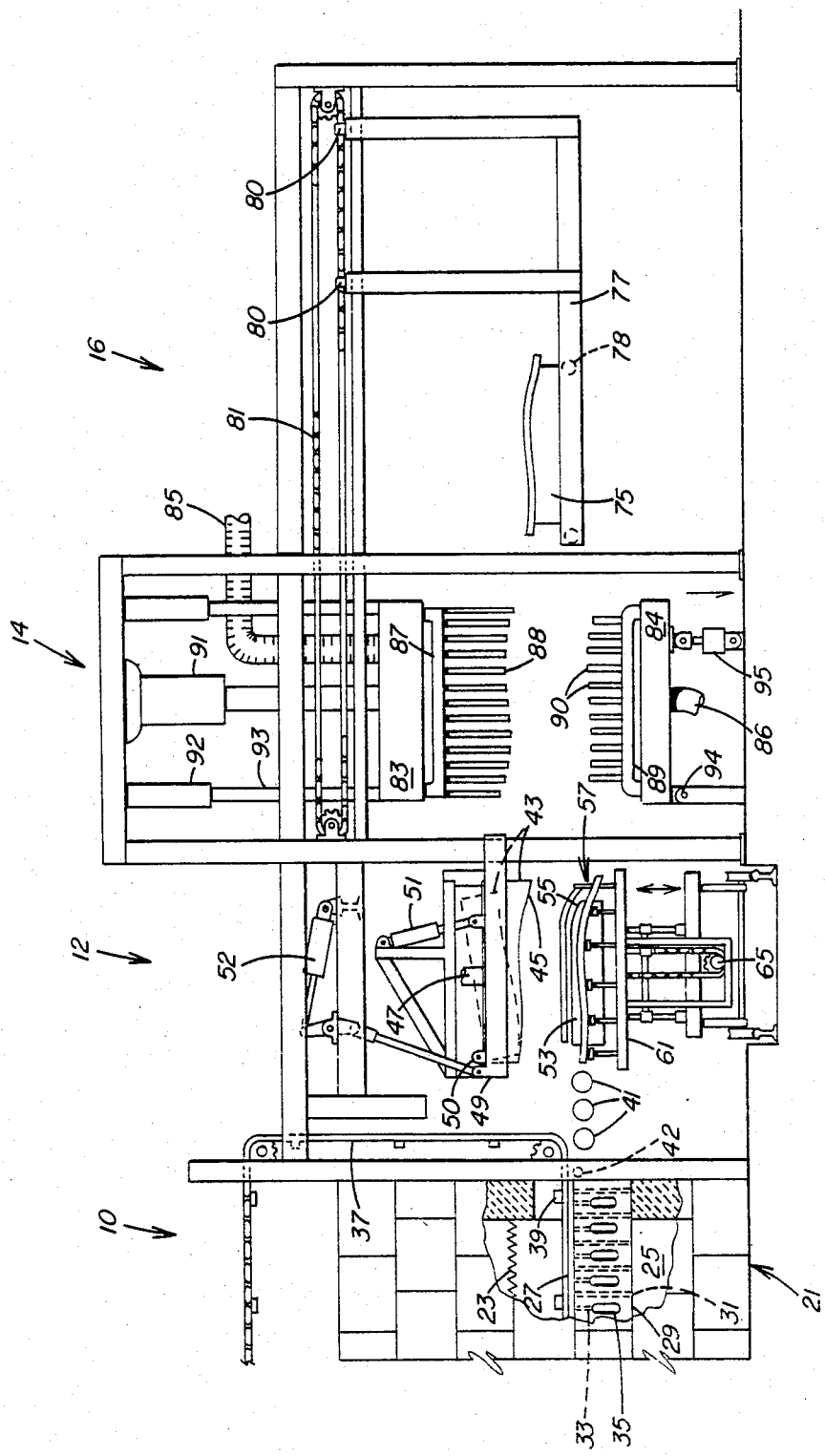
FIG. 1 is a partial longitudinal elevational view of apparatus for bending and tempering glass sheets having a shaping station modified according to the present invention with parts omitted to show other parts more clearly.
Figure 2:
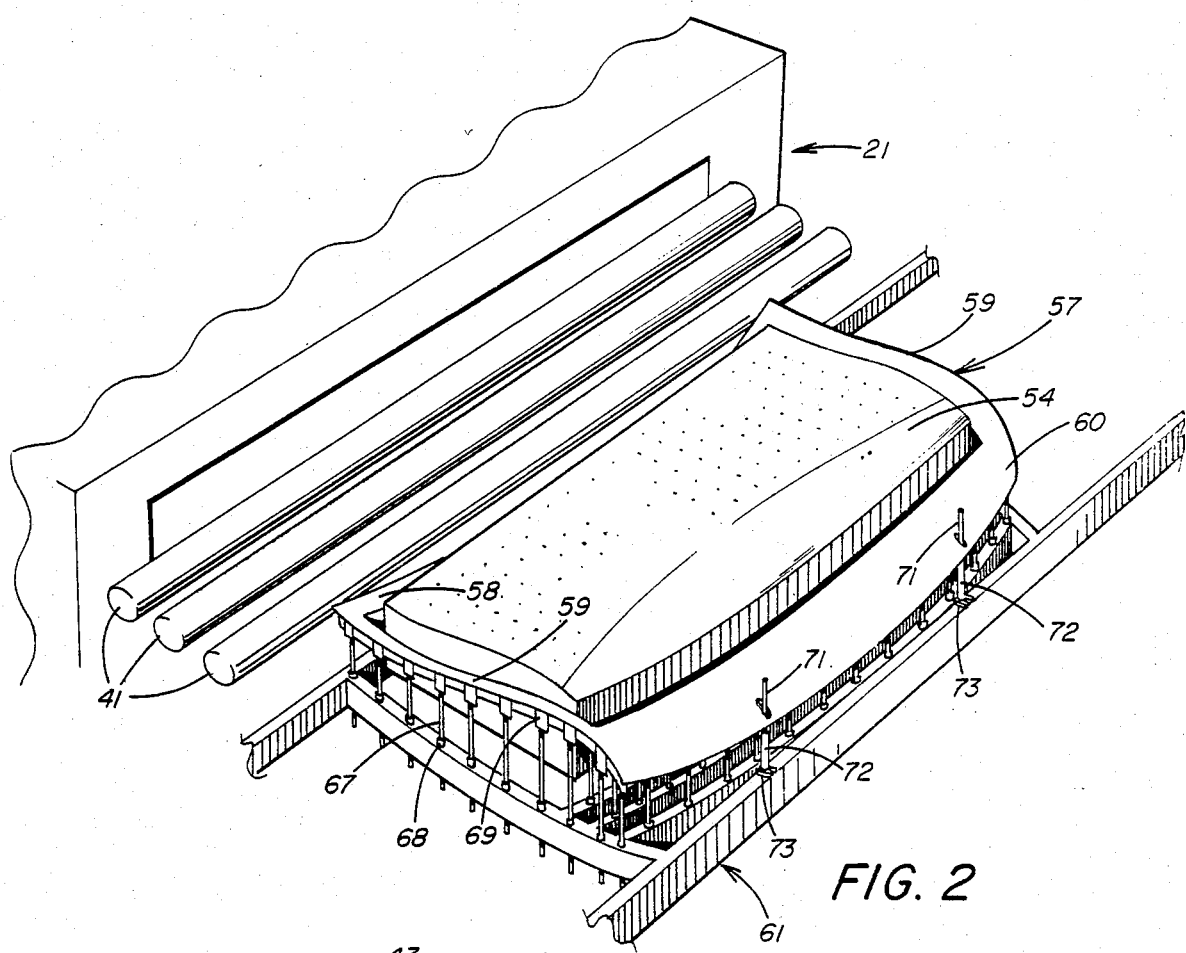
FIG. 2 is a perspective view of the lower portion of the shaping station of FIG. 1, showing an auxiliary gaseous hearth bed with a lower bending mold disposed in surrounding relation thereto at the shaping station just beyond the exit end of a heating furnace, with parts omitted to show other parts more clearly.

Referring to the drawings, and particularly FIG. 1, a typical apparatus comprises a heating area 10, a shaping station 12, a cooling station 14 and an unloading station 16, shown in end-to-end relation. Glass sheets are generally conveyed along a path through the length of the heating area 10 and arrive at the shaping station 12 where they are shaped to the desired configuration and then transported to the cooling station 14. After sufficient exposure to cold blasts at the cooling station, the bent and cooled glass sheet, to which a desired degree of temper has been imparted, is transferred to the unloading station 16 and removed.

More specifically, the heating area 10 comprises a tunnel-type furnace 21 of the gas hearth type having overhead electric heaters 23 and a lower gas hearth plenum 25 providing a gas hearth support surface 27 on the upper surface of an apertured roof 29 of the gas hearth plenum 25. It is understood that this type of controlled heating system is recited by way of example and is not limiting to the present invention.

The temperature along the furnace length is controlled by computers in a manner well known in the art. A Digital Electronic Corporation PDP 11/24 Host computer and a PDP 11/23 microcomputer are preferred for use for temperature control.

The roof 29 is provided with supply passages 31 that extend completely through the thickness of the roof from the gas hearth plenum 25 to the upper surface 27 of the roof 29. In addition, exhaust passages 33 extend downward from the upper surface 27 into cross passages 35 intermediate the thickness of the roof 29 to provide exhaust passageways for hot gas that is supplied in an upward direction through supply passages 31 to provide a thin layer of hot gas upon which glass sheets are supported during their conveyance through the tunnel-like furnace 21.

A pair of driving chains 37 each having transversely aligned lugs 39 interconnected by a cross bar (not shown) is provided to cause a series of spaced glass sheets floated through the tunnel-type furnace 21 to be conveyed to the exit end of the furnace. During the transfer of the glass sheets, the heat applied through the overhead electrical heaters 23 and from the gas hearth plenum 25 is so arranged that the leading edge of the glass sheet arrives at the exit of the furnace at a slightly higher temperature than the trailing edge.

Also included is a glass sensing mechanism 42 which determines the location of a glass sheet either by magnetic detection of a specific lug 39 or which detects a glass sheet directly, such as an optical or electrical glass sensing device. The sensing mechanism initiates operation of a programmable controller (not shown) that determines the sequence for operating various actuating means to be disclosed hereinafter so as to ensure that the apparatus operates in proper synchronism.

A preferred controller for this purpose is a Modicon 384 programmable controller. While the glass sensing mechanism is shown at the exit end of the furnace for illustration, it is understood that such a device may be located anywhere along the glass movement path that is convenient. Immediately beyond the exit of the furnace are a plurality of silica transfer rolls 41 covered by fiberglass sleeves. The transfer rolls 41 bridge the gap between the exit of the furnace 21 and the shaping station 12. The transfer rolls 41 are located in such positions that they define a continuation of the upper surface 27 at which the glass sheets are supported over the gas hearth plenum 25.

The shaping station 12 comprises an upper vacuum mold 43, having a downward facing surface that is curved both longitudinally and transverse to the path of travel defined by the driving chains 37 and the transfer rolls 41 and includes a longitudinal bend about an axis extending longitudinally of the path and a transverse bend extending about an axis transversely of said path. The downstream end of the downwardly facing shaping surface of the upper vacuum mold 43 has a downwardly curved end portion 45 of substantially S-shaped configuration. The upper vacuum mold has a vacuum chamber whose downward facing wall is apertured and is covered by a fiberglass cloth cover (not shown) and communicates to a source of vacuum through a flexible vacuum pipe 47. The upper vacuum mold 43 is supported on a support frame 49. The latter is pivoted on a pivot support 50 at its upstream end portion and its vertical position of the downwardly curved end portion 45 is adjustable through a piston means 51. The support frame 49 is supported for vertical movement relative to overhead structure through vertical adjustment means 52 which includes a piston and linkage arrangement.

An auxiliary gaseous hearth bed 53 is disposed beneath the downwardly facing shaping surface of the upper vacuum mold 43. The auxiliary gaseous hearth bed has an upper surface provided with a downwardly curved, downstream end portion 55. The latter is curved downwardly both transversely and longitudinally of the path of glass sheet movement when the shape to be made in the glass is concave in elevation transverse to the path and includes an S-shape configuration at the downstream side of the glass sheet. Except for the downwardly curved downstream end portion and difference in size, the auxiliary gas hearth bed 53 is similar to the gas hearth in furnace 21.

In a particular embodiment to form a shape that is concave in elevation in a direction transverse to the path of glass movement and has an S-shaped configuration at the downstream end portion of the glass sheet, the upper surface of the auxiliary gaseous hearth bed 53 is flat except for a downstream end portoin that extends downward from a transversely curved boundary 54 that is convexly curved in the upstream direction. The downwardly curved downstream end portion 55 blends downwardly away from the flat upstream surface portion of bed 53 and also blends transversely of the glass path to form a downstream end of concave elevation in the transverse direction and in convex elevation in the longitudinal direction of said path.

A lower shaping mold 57 surrounds the auxiliary gas hearth bed 53. The lower shaping mold 57 comprises a first longitudinal rail portion 58 of T-shape cross section, having an upper surface of concave longitudinal shape extending transversely of the path of movement defined by the driving chains 37 and the transfer rolls 41 on the side of the auxiliary gas hearth bed 53 that faces the end of the furnace 21. A pair of transverse side rail portions 59, also of T-shape cross section have upper surfaces extend longitudinally of said path. The transverse rail portions 59 are interconnected by a second longitudinal rail portion 60 at the downstream end of the lower shaping mold 57 from the ends of the first longitudinal rail portion 58. The second longitudinal rail portion has an upper surface of transverse S-shape combined with a longitudinal shape of generally concave elevational shape which is provided for the first longitudinal rail portion 58. The latter upper surface of the second longitudinal rail portion 60 has a shape that blends with the shape at the downstream end of the downwardly curved downstream end portion 55.

Each of the rail portions 58 and 59 is composed of a T-shaped metal rail covered by a continuous frame of an alumina-silica paper such as two thicknesses of a paper $\frac{1}{8}$ inch (3.2 mm) thick having a typical analysis by weight of 51.9% $Al_2O_3$, 47.9% $SiO_2$, 0.08% $Na_2O$ and 0.1% $Fe_2O_3$. The paper is made by Carborundum and identified by the trademark Fiberfrax 970J paper. The paper is held in place by wrapping a seamless frame wider than the width of the rail portions and composed of a stretched knit fiberglass cloth fabric that forms a seamless cover over the paper and stapling or clamping together the ends of the fiberglass cloth cover wrapped around the stems of the rails. The rail portion 60 is also covered with paper over which a stretched knit fiberglass cloth fabric cover is wrapped with the free ends of the wrapped fiberglass cloth fabric secured together by staples, pins or clips beneath the rail portion 60.

The lower shaping mold 57 is supported on a rigid reinforcing frame 61. The rigid reinforcing frame also includes an auxiliary reinforcing beam 62 below the first longitudinal rail portion 58 and curved in plan to conform to the shape of rail portion 58 as well as three auxiliary longitudinal reinforcing beams 63 below the second longitudinal rail portion 60. Elevator means 65 is provided to raise and lower the rigid reinforcing frame 61 together with the lower shaping mold 57. The second longitudinal rail portion 60 is located immediately downstream of the downstream end of the downwardly curved end portion 55 of auxiliary gaseous hearth bed 53. It is understood that the number and arrangement of auxiliary reinforcement beams may be changed without departing from the scope of this invention.

Means is provided to adjust the rail portions of the lower shaping mold 57 relative to the rigid reinforcing frame 61 or the auxiliary reinforcing beams 62 or 63. Each of these adjustment means comprises a vertically extending threaded shaft 67 whose vertical position is adjusted relative to either the rigid reinforcing frame 61 or the auxiliary reinforcing beam 62 or 63 by lock nuts 68. A clevis 69 is attached to the upper end of each vertically extending threaded shaft 67. The upper clevises for rail portions 58 and 59 are connected with nuts and bolts to stems extending downward from the first longitudinal rail portion 58 of T-shaped section or each of the transverse side rail portions 59, also of T-shaped cross section.

At least two auxiliary reinforcing beams 63 (three being shown) extend longitudinally in spaced relation below the second longitudinal rail portion 60. The beams are connected along their length to different locations of the second longitudinal rail portion 60 by additional adjustment means including additional clevises 69 bolted to the downwardly extending stems of T-members welded to the undersurface of the second longitudinal rail portion 60 at the upper end of vertically extending threaded shafts 67. The latter are secured near their lower ends to the different auxiliary reinforcing beams 63 in vertically adjusted position using lock nuts 68 as in the previous vertically extending threaded shafts for the other rail portions 58 and 59.

Figure 7:
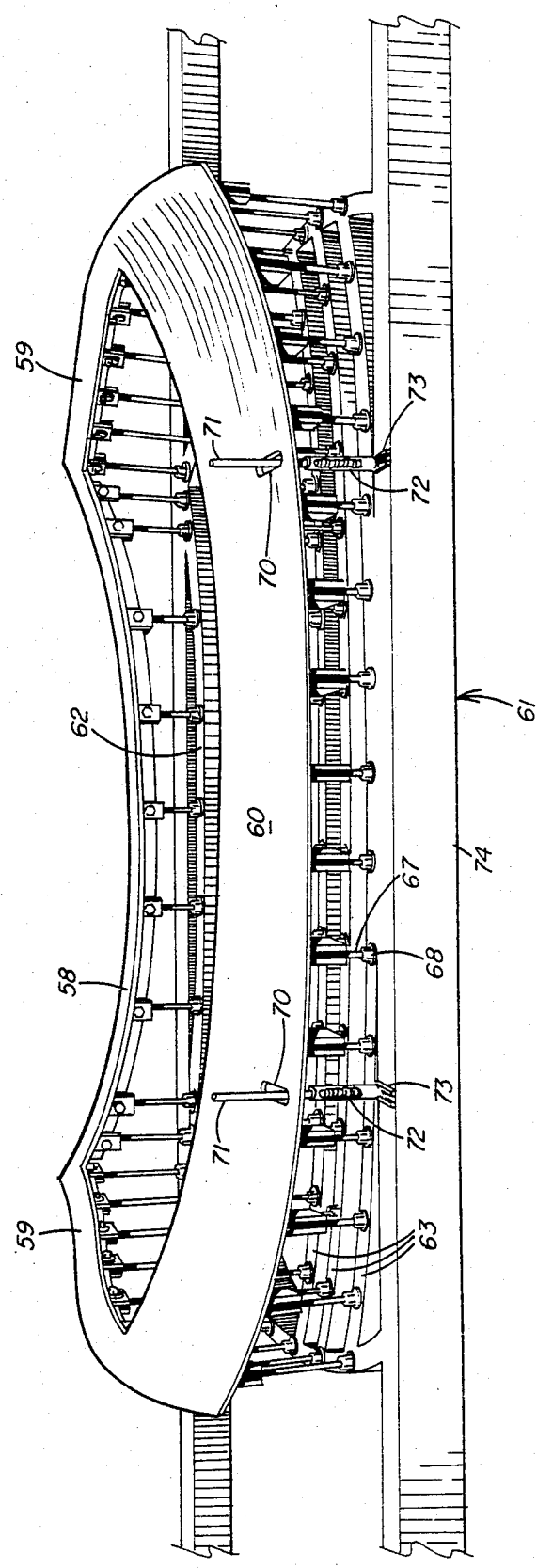
FIG. 7 is a frontal view in perspective of the lower shaping mold of the present invention.

A pair of elongated slots 70 is provided in longitudinally spaced relation along the second longitudinal rail portion 60 to receive a pair of spring loaded stop members 71. The latter are preferably of the type disclosed and claimed in copending U.S. patent application Ser. No. 616,622 of Terry A. Bennett, William B. Zimmerman and Barry L. Shadle for SPRING LOADED STOP MEMBER FOR GLASS SHEET SHAPING MOLDS, filed the same day as this case. Each stop member 71 is received in a cylindrical housing 72 and is biased by a spring within the housing to extend upward from said housing. The housing is supported on a slotted support plate 73 that is adjustably fixed to a downstream rectangular pipe member 74 (FIG. 7) of the rigid reinforcing frame 61.

The spring loaded stop members 71 are preferably composed of graphitic bushings in the glass edge contact area held together by a threaded shaft that extends into housing 73. The stop members 71 are located in positions that would normally be attained by the leading edge of a glass sheet that droops over the downwardly curved downstream end portion 55 of the auxiliary gaseous hearth bed 53 when a glass sheet is delivered to the shaping station for bending. The lower shaping mold 57 is located relative to the upper vacuum mold 43 so that the stop members 71 engage the downwardly curved end portion 45 of the upper vacuum mold 43 when the lower shaping mold 57 is lifted. Spring loaded stop members 71, upon engaging the downwardly curved end portion 45 of the upper vacuum mold 43, retract into the cylindrical housings 72 to permit the downwardly curved second longitudinal rail portion to conform with the downwardly curved end portion 45 of the upper vacuum mold 43 and sandwich the downstream edge portion of the glass sheet G therebetween.

The apparatus also include a ring-like member 75 supported in cantilever relation from a shuttle carriage 77 via cross members 78. The carriage is provided with vertical connecting members 79 to lugs 80 fixed to twin chain drives 81. The chain drives move the carriage 77 and its supported ring-like member 75 between unloading station 16 and a position intermediate the upper vacuum mold 43 and the auxiliary gaseous hearth bed 53 when the lower shaping mold 57 is retracted downwardly and then to a position in the cooling station 14. The ring-like member 75 is similar in construction to that of U.S. Pat. No. 3,973,943 to Seymour and comprises a reinforcing metal ring hugging the lower portion of a glass engaging ring or bars of non-metallic material that does not mar glass. A suitable material for the glass engaging bars or ring is a phenolic-aramid laminate sold by Spalding Fiber C., Inc., of Tonawanda, N.Y. as ARK-2 phenolic-aramid laminate.

The cooling station 14 comprises an upper cooling air plenum 83 and a lower cooling air plenum 84. An upper flexible supply pipe 85 supplies air under pressure to the upper cooling air plenum 83, and a similar lower flexible supply pipe 86 supplies cool air under pressure to the lower cooling air plenum 84. Upper apertured pipes 87 of U-shaped elevation are connected to extend different distances downward from upper air plenum 83 in a configuration transverse to the path of movement taken by the glass to conform to the longitudinal shape of the glass sheet and are provided with nozzles 88 that extend downwardly from downwardly facing apertures of the upper apertured pipes to have the pipe ends form a configuration conforming to the S-shaped transverse configuration of the glass sheet. The lower cooling air plenum 84 is provided with a series of lower apertured pipes 89 of inverted U-shaped elevation connected to extend different distances upward from lower plenum 84 in a configuration conforming to the longitudinal shape of the sheet. Each lower apertured pipe 89 has upwardly directed apertures from which upwardly extending nozzles 90 extend. The length of the nozzles along the length of the lower apertured pipes is such as to provide a shape conforming to the transverse shape of the glass sheet including the portion having the S-shaped configuration.

An upper piston 91 is connected to the upper plenum chamber 83 to raise and lower the upper plenum as required. Upper guide sleeves 92 slidably support upper guide rods 93 attached to extend upward from the upper plenum chamber 83 to ensure that the movement of the upper plenum chamber 83 is in a vertical direction. The lower plenum chamber 84 is supported on a pivotal support 94 and is actuated for movement between an upper position depicted in FIG. 1 and an oblique position by a lower piston 95. The oblique pivoting of the lower cooling air plenum 84 helps to remove glass fragments in the event of breakage in the cooling station.

The operation of apparatus according to the present invention involves mounting a series of spaced glass sheets at the entrance of the tunnel-like furnace 21 and moving the glass sheets through the furnace at a rate such that the leading edge of the glass develops a slightly higher temperature than the trailing edge of the glass and that the lowest temperature of the glass is at least at the deformation temperature of the glass, which is in the range of 1200° F. to 1220° F. (650° C. to 660° C.). The leading glass sheet in the series, when it reaches a position at which it is detected by the glass sensing mechanism 42, actuates the programmable controller (not shown) and is immediately conveyed over the transfer rolls 41 and onto a position above the auxiliary gaseous hearth bed 53.

The leading edge of the glass sheet is sufficiently hot to conform to the downwardly curved shape of the downstream end portion 55 of the auxiliary gaseous hearth bed 53. At the proper time, depending upon the speed of rotation of the transfer rolls 41, which delivers the glass sheet at a higher speed than the speed of the driving chains 37, the elevator means 65 is actuated to lift the lower shaping mold 57.

The outline shaping mold 57 engages a frame-like perimeter portion of the glass sheet and forces it up against the downwardly facing shaping surface of the upper vacuum mold 43. At its downstream end portion, the downwardly sagged glass sheet portion assumes an S-shaped configuration as it is sandwiched between upper vacuum mold portion 45 and the second longitudinal rail portion 60 of lower shaping mold 57.

Figure 3:
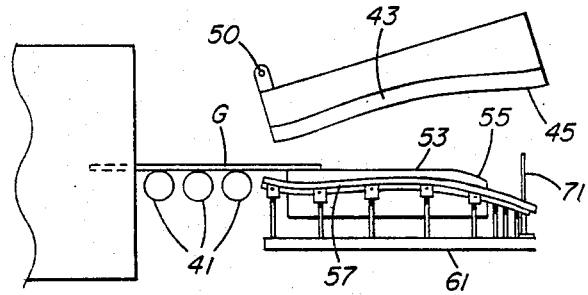
FIG. 3 is a schematic view of a portion of a shaping station showing a glass sheet entering the shaping station.
Figure 4:
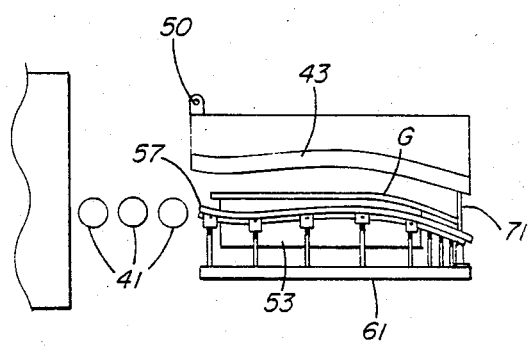
FIG. 4 is a view of the portion of the shaping station as depicted in FIG. 3 showing the glass sheet after its arrival at its shaping position.
Figure 5:
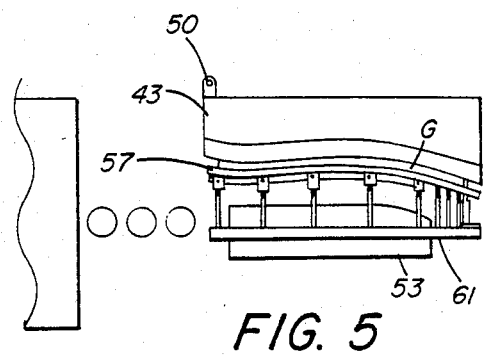
FIG. 5 is a view similar to FIGS. 3 and 4 showing a glass sheet sandwiched between the upper and lower molds of the shaping station of the present invention.
Figure 6:
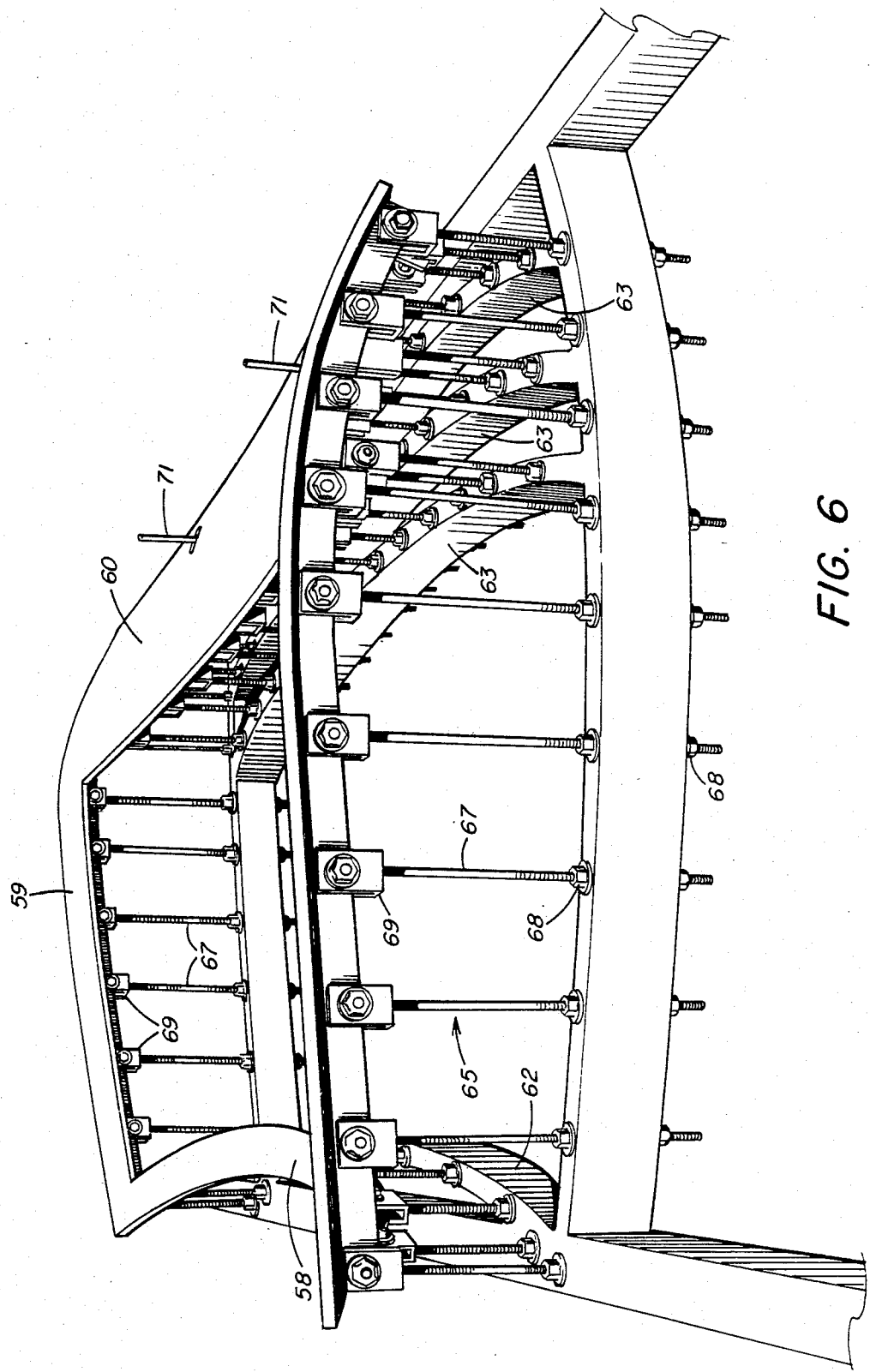
FIG. 6 is a side view of the lower shaping mold of the present invention showing how the shaping rail portions are connected to a reinforcement frame.

The upper vacuum mold 43 which was pivoted initially in the obliquely upward position as shown by the dashed lines in FIG. 1, and also depicted in FIG. 3, is pivoted downward to the position shown in full lines in FIG. 1 and in FIG. 4, while the lower shaping mold 57 moves upward to cause the glass sheet G to develop the transverse shape required. The lower shaping mold 57 and upper vacuum mold 43 also impress a longitudinal bend on the glass sheet about an axis extending longitudinally of the path of movement of the glass.

The leading edge portion of the glass sheet in the downstream direction of the path of glass movement flows downwardly relative to the remainder of the glass sheet. The lower shaping mold 57 is lifted to impress its outline elevational shape on the glass sheet and finally, the glass sheet is sandwiched between the upward facing surface of the lower shaping mold 57 and the downward facing surface of the upper vacuum mold 43. A vacuum is applied to the vacuum mold to engage the glass sheet by vacuum and to ensure that the glass sheet conforms more closely to the shape of the upper vacuum mold. Lower mold 57 is then lowered to the retracted position, and the ring-like member 75 is transferred into a position below the upper vacuum mold 43. The vacuum mold 43 may be pivoted upward again after it engages the glass sheet to permit the ring-like member 75 to move into position to receive the glass sheet G engaged by vacuum against the lower surface of the vacuum mold 43. After the ring-like member 75 arrives in position beneath the upper vacuum mold 43, the upper vacuum mold 43 is again pivoted to a horizontal disposition and the glassd sheet is released by releasing the vacuum. The glass sheet then drops onto the upper surface of the ring-like member 75 which conforms to an outline shape slightly inward of the glass sheet outline and supports it for movement into the cooling station 14 where the ring-like member 75 is reciprocated linearly while air is blasted against the upper and lower surfaces of the glass sheet at a rate sufficient to impart a desired degree of temper in the glass. When sufficient cooling has taken place, the shuttle carriage 77 moves the ring-like member 75 into the unloading station 16 where the glass sheet is removed from the ring-like member 75 and the latter is returned into a parking position at the cooling station 14 to await the disposition of the next glass sheet. At the same time, the upper vacuum mold 43 which has been again pivoted into an upward oblique position to permit clearance for the next glass sheet to enter the shaping station 12 below the upper vacuum mold 43 remains in such position until such time as the next sheet completes its arrival.

One benefit of the present invention is that the glass sheet is oriented in a manner such that the portion to which an S-shape is to be imparted is on the downstream side of the glass sheet which is hotter than the upstream side. The movement of the various moving elements of the apparatus is synchronized in response to the sensing of a particular glass sheet which sets into motion a series of events based in time sequence as determined by a programmable controller that controls the times at which each element operates after the glass sheet has arrived at the sensing location and is moved toward the shaping station. The upward and downward movement of the upper plenum chamber is also coordinated with movement of the ring-like member 75. The upward and downward movements of the upper vacuum mold 43 and the lower shaping mold 57 are coordinated with the movement of the glass sheet into the shaping station and the subsequent need to release the glass sheet from the vacuum mold 43 onto the outline shaping surface of the ring-like member 75.

Such programmable controllers that coordinate the onset and stopping of activity of moving elements in timed relation after the detection of the presence of the glass sheet or a particular lug 39 of the chain drive 37 that starts a cycle to operate are well known in the art and a preferred device for controlling the movement of the various movable elements is a Modicon 384 programmable controller.

Another manner of sequencing the operations is to initiate a timing sequence using a series of limit switches, each controlling a timer circuit for each actuated element. The first limit switch is actuated by a cross bar connecting a pair of transversely opposing lugs 39, which engages the leading edge of a glass sheet that controls the position of the glass during movement along the length of a tunnel-type furnace in which the gas hearth support surface 27 is sloped slightly downward along its portion aproaching the exit of the furnace 21. As the glass sheet is released from the constraint provided by the cross bar extending between the lugs 39, the floating glass sheet traverses the three rotating ceramic rolls 41 covered with fiberglass cloth sleeves and floats over the auxiliary gaseous hearth bed 53 toward its downwardly curved down stream end portion 55. At the start of the cycle, the upper vacuum mold 43 is tilted relative to pivot support 50 so that its downwardly curved end portion 45 is raised to provide clearance for the hot flat glass sheet to move in floating relation over the auxiliary gaseous hearth bed 53 and to have its forward end sag or flow toward the downwardly curved downstream end portion 55. At the same time, the lower shaping mold 57 is kept below the upper surface of the auxiliary gas hearth bed 53 including its downwardly curved downstream end portion 55 so that only the upper ends of the spring-loaded stop members 71 extend vertically upward beyond the downwardly curved end portion 55 of the auxiliary gaseous hearth bed 53 to engage the downwardly sagged downstream edge portion of the glass sheet at its edge.

The first limit switch of an alternate control system based on limit switches and timer circuits starts a timer circuit controlling the vertical upward movement of the lower shaping mold 57 and the downward pivoting of the upper vacuum mold 43 at a time interval following the first limit switch actuation so that just as the leading edge of the glass sheet engages the spring-loaded stop member 71, the lower shaping mold 57 rises to the level of glass sheet support provided by the auxiliary gas hearth bed 53 and lifts the glass sheet toward the downwardly moved upper vacuum mold 43. The vacuum mold 43 reaches its extreme lower angular position as the second longitudinal rail portion 60 which contains the transverse S-shaped elements is lifting the glass toward the upper vacuum mold 43. During this upward movement, the upper ends of the stop members 71 engage the downwardly curved end portion 45 of the upper vacuum mold to cause the spring-loaded stop members 71 to become recessed into the cylindrical housings 72 and permit the second longitudinal rail portion 60 to impart an S-shaped configuration to the downstream portion of the glass sheet.

Vacuum is started in the vacuum mold 43 when the latter reaches its lower position and engages a limit switch that controls a vacuum timer circuit. In this way, the lifted glass sheet becomes engaged between the lower shaping mold 57 to which it has deformed and developed the outline shape thereof and the upper vacuum mold 43 while vacuum is applied to the vacuum mold. Thus the glass sheet is engaged by vacuum applied through the vacuum mold which then pivots upwardly again in response to a limit switch actuating a timer circuit in response to the lower mold engaging the latter limit switch to provide clearance for the ring-like member 75. When the lower shaping mold 57 engages the glass sheet against the upper vacuum mold 43, it actuates another limit switch that operates a timer that times out to lower shaping mold 57 rapidly. Vacuum continues on the vacuum mold 43 to continue to engage the glass sheet thereagainst as the vacuum mold pivots upward about pivot support 50. The ring-like member 75, which has been in a parking position at the cooling station 14, shuttles into position beneath the upper vacuum mold 43 in response to the lower mold 57 engaging another limit switch during its downward movement.

The ring-like member has a shape conforming to the outline shape of the glass sheet that has been imparted by the lower shaping mold 57 and the upper vacuum mold 43 so that when the upper portions of the ring-like member pass the downwardly curved downstream end portion 45 of the upper vacuum mold 43, the ring-like member engages another limit switch that controls pivoting movement of the upper vacuum mold 43 into its down position. When the ring-like member 75 is in its proper position of alignment and the upper vacuum mold is in its downwardly pivoted position, the ring-like member engages another limit switch to cause the vacuum to be discontinued (and positive pressure applied, if desired), and the glass sheet is released from engagement against the lower surface of vacuum mold 43 and drops onto the upper outline surface of the ring-like member 75. The timer circuit controlled by the last limit switch again causes upper vacuum mold 43 to be pivoted into an upper oblique position for the downwardly curved downstream end portion 45, and the ring-like member 75 containing the shaped glass sheet thereover is moved to the cooling station 14 under control of another timer circuit. Another limit switch is engaged by the ring-like member when the latter reaches the cooling station to reciprocate the ring-like member 75 between the upper and lower nozzles which apply pressurized cold air against the opposite surfaces of the glass sheet to impart a desired degree of temper. When the glass sheet has been cooled sufficiently, the latter timer circuit times out to convey the ring-like member holding the shaped glass sheet in a forward direction to the unloading station. The latter timer also causes upper plenum 83 to be lifted to provide clearance for the ring-like member 75 to pass from the cooling station 14 into the unloading station 16, if the depth of bend requires such movement for clearance. There, the ring-like member 75 actuates another limit switch that actuates a timer circuit that delays further movement of the ring-like member. The upper plenum 83 remains in its upper position until the ring-like member 75 has been unloaded with the glass sheet removed therefrom, and the last named timer circuit times out to return the ring-like member 75 to a parking position within the cooling station 14 to await the need for its movement to a position below the upper vacuum mold 43 at the shaping station 12 during the fabrication of the next succeeding glass sheet.

The form of this invention shown and described in this disclosure represents an illustrative preferred embodiment and certain modifications thereof. It is understood that various other changes may be made such as sectionalizing the lower shaping mold and moving the end mold sections in cyclic relation to the main mold section in a manner well known in the art, without departing from the gist of the invention as defined in the claimed subject matter which follows.

What is claimed is:

1. Apparatus for shaping a hot glass sheet to a complicated shape comprising a longitudinal component of bend containing a concave element in elevation about a transverse axis of bending combined with a transverse component of bend of generally S-shaped configuration containing both convex and concave elements of bending to one side of the longitudinal axis of bending comprising a shaping station including an upper vacuum shaping mold and a lower shaping mold having complementary shaping surfaces conforming to the shape desired for a heat-softened glass sheet, a gaseous hearth bed having an upper surface below said upper vacuum shaping mold for supporting an arriving glass sheet thereover means to provide motion in an essentially vertical direction to said lower shaping mold between a retracted position below said upper surface of said gaseous hearth bed and a glass sheet engaging position above said upper surface, a ring-like member movable in an essentially horizontal direction between a downstream position beyond said shaping station and an upstream position between said upper vacuum mold and said upper surface of said gaseous hearth bed when said lower mold is in said retracted position, and conveyor means for conveying said glass sheet into said shaping station along a path from a position upstream of said shaping station when said lower mold is retracted and said ring-like member is located downstream of said shaping station, characterized by said upper vacuum mold having a downwardly facing surface curved in concave elevation transverse to said path and provided with a downwardly curved end portion in the downstream direction of said path, and said upper surface of said gaseous hearth bed having a downwardly curved end portion in the downstream direction of said path permitting the downstream end portion of said glass sheet to flow downward as it arrives in position over said gaseous hearth bed.

2. Apparatus as in claim 1, further characterized by said upper surface of said gaseous hearth bed being curved transversely along said downwardly curved end portion to provide a concave elevational configuration transverse to said downwardly curved end portion.

3. Apparatus as in claim 2, wherein said upper surface of said gaseous hearth bed has an essentially flat upstream portion merging into said downwardly curved downstream end portion.

4. Apparatus as in claim 1, further characterized by said lower mold being of outline configuration, comprising:

a first longitudinal rail portion extending transversely of said path immediately upstream of said gaseous hearth bed, a pair of transverse rail portions flanking the opposite sides of said gaseous hearth bed and extending longitudinally of said path and a second longitudinal rail portion of S-shaped transverse configuration extending transversely of said path and located immediately downstream of said gaseous hearth bed, said lower mold surrounding said gaseous hearth bed in its downwardly retracted position.

5. Apparatus as in claim 4, further including a rigid reinforcing frame for said lower mold and adjustment means interconnecting said reinforcing frame to longitudinally spaced portions of said first longitudinal rail portion and said transverse rail portions to adjust the shape along the length of said first longitudinal rail portion and said transverse rail portions, at least two spaced auxiliary reinforcing beams forming part of said rigid reinforcing frame and interconnecting opposite sides of said rigid reinforcing frame along lines located below said second longitudinal rail portion, adjustment means interconnecting said auxiliary reinforcement beams to longitudinally spaced portions of said second longitudinal rail portion, said adjustment means being attached to said second longitudinal rail portion along rows spaced transversely of one another along the length of said second longitudinal rail portion to adjust the shape of said second longitudinal rail portion both longitudinally and transversely thereof.

6. Apparatus as in claim 5, wherein each said adjustment means comprises a vertically extending threaded shaft bolted at its bottom end to either said rigid reinforcing frame or one of said auxiliary reinforcing beams and connected at its upper end to a clevis, said clevis being fixed to the underside of one of said rail portions and to the upper end portion of said externally threaded shaft and responsive to adjustment of said threaded shaft to alter the position of a localized portion of said rail portion in the vicinity of its connection thereto.

7. Apparatus as in claim 1, further characterized by means to move said upper vacuum mold in a generally upward direction transverse to said path of movement to provide clearance for entry of a flat glass sheet beneath said downwardly curved downstream end portion, to move said upper vacuum mold in a generally downward direction toward said gaseous hearth bed portion when said lower mold is lifted to align with said lifted lower mold and to move said upper vacuum mold in a generally upward direction when it engages said glass sheet by suction to provide clearance for said ring-like member to enter the space between said vacuum mold and said gaseous hearth bed.

8. Apparatus as in claim 1, wherein said shaping station is located downstream of a tunnel-like heating furnace having means to convey a glass sheet therethrough in such a manner that the leading edge portion of the glass sheet develops a higher temperature than the trailing edge portion of said glass sheet when said heated glass sheet leaves said furnace.

9. Apparatus as in claim 8, wherein said furnace comprises a gas hearth constructed and arranged to float glass sheets in close adjacency thereover and conveyor means to move said glass sheets through said furnace.

10. Apparatus as in claim 3, further characterized by said upper surface of said gaseous hearth bed having an essentially flat portion upstream of said downwardly curved end portion and having an arcuate boundary between said essentially flat upstream portion and said downwardly curved end portion.

11. A method of shaping a glass sheet having a longitudinal axis and a transverse axis to a complicated shape comprising, a longitudinal component of bend containing a concave element in elevation about a transverse axis of bending combined with a transverse bend including a component of bend of generally S-shape configuration about a longitudinal axis of bending containing both concave and convex elements of bending to one side of the center line of the glass sheet comprising, orienting said glass sheet with its longitudinal axis extending transversely of a path of movement and with its portion destined to develop said component of bend of generally S-shape configuration disposed as the leading edge portion of said glass sheet, conveying said sheet while so oriented along a path through a tunnel-like furnace and onto a gaseous hearth bed having a downwardly curved end portion downstream of said path such that the glass sheet is heated to its deformation temperature with its leading edge slightly hotter than its trailing edge en route to said downwardly curved end portion whereby said leading edge flows downwardly to sag toward said downwardly curved end portion, supporting a vacuum mold having a downwardly curved downstream end portion superimposed over said downwardly curved end portion of said gaseous hearth bed in sufficiently spaced relation over said gaseous hearth bed to provide clearance for entry of said glass sheet between said vacuum mold and said gaseous hearth bed, lifting said glass sheet on an outline shaping mold above said gaseous hearth bed and toward said vacuum mold with the sagged downstream end portion of the glass sheet supported on a rail portion of said outline shaping mold having an upper surface of S-shaped configuration in elevation about an axis extending transverse to said path, applying vacuum to said vacuum mold when said lifted glass sheet nears the vicinity of said vacuum mold to engage said glass sheet by vacuum against said vacuum mold, lowering said outline shaping mold while continuing to apply vacuum to engage said glass sheet by vacuum against said vacuum mold, shuttling a ring-like member into position below said vacuum mold when said outline shaping mold is lowered sufficiently to provide clearance for said ring-like member, discontinuing said vacuum to deposit said glass sheet onto said ring-like member, and removing said glass sheet from below said vacuum mold while supported by said outline shaping mold.

12. A method as in claim 11, further including heating said leading edge sufficiently while over a portion of said gaseous hearth member to sag said sheet to develop a transverse bend of concave elevation simultaneously with said downward sag in the direction of said path in said leading edge portion prior to lifting said glass sheet.

13. A method as in claim 11, further including cooling said glass sheet rapidly enough to establish a desired degree of temper therein while the glass sheet is supported on said ring-like member.

14. A method as in claim 12, wherein said ring-like member shuttles said glass sheet to a position beyond said position between said gaseous hearth bed and said vacuum mold prior to cooling said glass sheet rapidly.

15. A method as in claim 11, wherein said upper vacuum mold is lifted while said outline shaping mold is lowered to provide clearance for said ring-like member to shuttle into position below said vacuum mold and said upper vacuum mold is lowered after said ring-like member shuttles into said position prior to discontinuing said vacuum.

* * * * *